United States Patent [19]

Nakada et al.

[11] Patent Number: 5,792,302
[45] Date of Patent: Aug. 11, 1998

[54] MANUFACTURING METHOD FOR MOLDED ARTICLE

[75] Inventors: Yasuhiro Nakada; Takayuki Endo, both of Hamamatsu, Japan

[73] Assignee: Yamaha Corporation, Japan

[21] Appl. No.: 649,299

[22] Filed: May 17, 1996

[30]  Foreign Application Priority Data

May 19, 1995 [JP] Japan ................... 7-121820

[51] Int. Cl.⁶ .................. B29C 44/06; B29C 44/12; B32B 31/06
[52] U.S. Cl. .................. 156/293; 264/46.4; 264/46.5; 264/46.6; 264/46.7; 264/259; 264/267
[58] Field of Search .................. 156/293, 294; 264/46.7, 46.9, 46.5, 46.6, 257, 261, 267, 46.4, 259; 29/894.1

[56]  References Cited

U.S. PATENT DOCUMENTS

| | | | |
|---|---|---|---|
| 2,327,931 | 8/1943 | Ratner | 264/46.7 |
| 2,717,024 | 9/1955 | Jelinek | 156/293 |
| 3,132,417 | 5/1964 | Irwin | 264/46.6 |
| 3,850,717 | 11/1974 | Keur et al. | 156/294 |
| 3,856,603 | 12/1974 | Schaefer et al. | 156/293 |
| 3,871,521 | 3/1975 | Szatkowski | 264/46.6 |
| 3,928,691 | 12/1975 | Knudson | 156/293 |
| 3,963,546 | 6/1976 | Roberti | 156/293 |
| 4,640,150 | 2/1987 | Kobayashi et al. | 264/46.9 |
| 4,950,347 | 8/1990 | Futagawa | 156/293 |
| 5,009,733 | 4/1991 | Sakai | 156/184 |
| 5,072,093 | 12/1991 | Scheurer | 219/204 |
| 5,075,052 | 12/1991 | Malvassora | 264/46.7 |
| 5,549,779 | 8/1996 | Stoecklein | 156/293 |

FOREIGN PATENT DOCUMENTS

| | | | |
|---|---|---|---|
| 606181 | 10/1960 | Canada | 264/46.9 |
| 60-236871 | 11/1985 | Japan . | |
| 61-61836 | 3/1986 | Japan | 264/259 |
| 61-64579 | 4/1986 | Japan | 264/259 |
| 62-261426 | 11/1987 | Japan | 264/259 |
| 62-261427 | 11/1987 | Japan | 264/259 |
| 62-263035 | 11/1987 | Japan | 264/259 |
| 62-263036 | 11/1987 | Japan | 264/259 |
| 62-263037 | 11/1987 | Japan | 264/259 |
| 63-188565 | 8/1988 | Japan . | |
| 6-65543 | 3/1994 | Japan . | |

*Primary Examiner*—Allan R. Kuhns
*Attorney, Agent, or Firm*—Ostrolenk, Faber, Gerb & Soffen, LLP

[57]  ABSTRACT

A first wooden surface layer and a second wooden surface layer are arranged in a mold, a core wire is arranged within the space defined by the first wooden surface layer and the second wooden surface layer, and resin introduced into that space. The first wooden surface layer and the second wooden surface layer are pressed against the inner surface of the mold by means of the internal pressure of the resin, thereby molding the first wooden surface layer and the second wooden surface layer. It is possible to obtain a molded article in which a wooden surface layer, a resin core and a core wire have been unitarily integrated without the production of cracks in the wooden surface layer.

8 Claims, 5 Drawing Sheets

MANUFACTURING METHOD FOR MOLDED ARTICLE

BACKGROUND OF THE INVENTION

1. Field of the Invention

The present invention relates to a manufacturing method for a molded article, for example, a steering wheel, having a real wood laminate design on its surface. A wooden surface layer is arranged in a mold, the space to the inside of the wooden surface layer is filled with resin, and by means of internal pressure, the wooden surface layer is molded, providing at low cost a molded article which is superior in design.

2. Description of the Related Art

In the conventional art, as manufacturing methods for a steering wheel having a wood grain pattern, there are methods such as a method in which a sliced veneer is adhered by means of adhesive to a wooden core which has been divided into two, the two half wooden cores and a core wire are unitarily joined forming a steering wheel (Japanese Patent Application, First Publication, No. Hei 6-65543); a method in which tape like board material is laminated and adhered forming a ring shaped substrate, after this has been cut, a core wire is attached unitarily thereby forming a steering wheel (Japanese Patent Application, First Publication, No. Sho 60-236871); and the like.

However, in the method in which a sliced veneer is adhered to the wooden core material, in order to shape the wooden core, a good piece of wood without any cracks must be cut from the timber, it is also necessary to form a groove in the wooden core for inserting the core wire, and these types of troublesome processes reduce productivity.

In addition, in the method in which a substrate formed by laminating and adhering tape like board materials is cut, the yield of timber is low and the cost of production is high. In addition, as cheaper wood is used as a laminate to reduce costs, it is possible to obtain a wooden quality, however, a high quality surface is not obtained.

In contrast, a method in which the core comprises a molded resin body has also been proposed (Japanese Patent Application, First Publication, No. 63-188565); however, in this method, an article is formed by fixing cloth to the inner surface of a mold, arranging a core wire in the space to the inside of this cloth, and then filling the space between the cloth and the core wire with resin. That is to say, this is a method for manufacturing a steering wheel which has a cloth front surface, and it cannot be applied to the manufacture of a steering wheel which has a wooden surface.

SUMMARY OF THE INVENTION

An object of the present invention is to make it possible to mass produce at low cost molded articles, such as steering wheels, clock frames, jewelry boxes, parts used in motor vehicles (console panels, etc.), accessory cases and the like, which have high quality wood which is rare and valuable on their surface.

To solve the above-mentioned problems, the manufacturing method for a molded article of the present invention comprises the steps of (a) providing a first wooden surface layer and a second wooden surface layer in a mold; (b) providing a core wire in the mold in a substantially centric position in a cavity defined by the first wooden surface layer and the second wooden surface layer; and (c) introducing resin material into the cavity to press the first wooden surface layer and the second surface layer against the mold.

In addition, the manufacturing method for a molded article of the present invention comprises the steps of (a) providing a first wooden surface layer in a first mold; (b) introducing resin material into a cavity in the mold to press the first wooden surface layer against the mold to form a first molded component; (c) providing a second wooden surface layer in a second mold; (d) introducing resin material into a cavity in the mold to press the second wooden surface layer against the second mold to form a second molded component; (e) providing a core wire in grooves in the first and second molded components; and (f) laminating together the first and second molded components.

In the manufacturing method for a molded article of the present invention, a wooden surface layer which will form the surface of a molded article is divided into a first wooden surface layer and a second wooden surface layer and put into a mold, and resin is introduced into the space between these wooden surface layers. As the wooden surface layer is formed by means of the internal pressure of this resin, it is possible to prevent cracks in the wooden surface layer. This type of manufacturing method for a molded article, has simple steps, is excellent for mass production, and also has a good yield.

According to the present invention, an article in which a wooden surface layer, a core wire, and a resin core are unitarily integrated can be massed produced at low cost. In addition, as the wooden materials are only used on the surface it is possible for the amount used to be small. Consequently, it is possible to use wooden materials which have beautiful grains, and are rare and valuable.

In addition, it is also possible to separately arrange the first wooden surface layer in a mold, introduce resin into the space to the inside of that wooden layer, and form a first wooden surface layer by means of the internal pressure of that resin; form a second wooden surface layer in the same way; and then join the two obtained molded articles and a core wire. Even using this method, it is possible to prevent the production of cracks in the wooden surface layer during molding, and it is possible to mass produce at low cost a molded article in which a wooden surface layer, a core wire, and a resin core are unitarily integrated.

BRIEF DESCRIPTION OF THE DRAWINGS

FIG. 2A is a plane view, and FIG. 2B is a cross-section along the line B—B of FIG. 2A.

DESCRIPTION OF THE PREFERRED EMBODIMENTS

In the following, in order that the present invention can be more easily understood, embodiments of the invention will be explained. These embodiments show one application for the present invention, however, the present invention is not limited to these embodiments.

Figure 1:
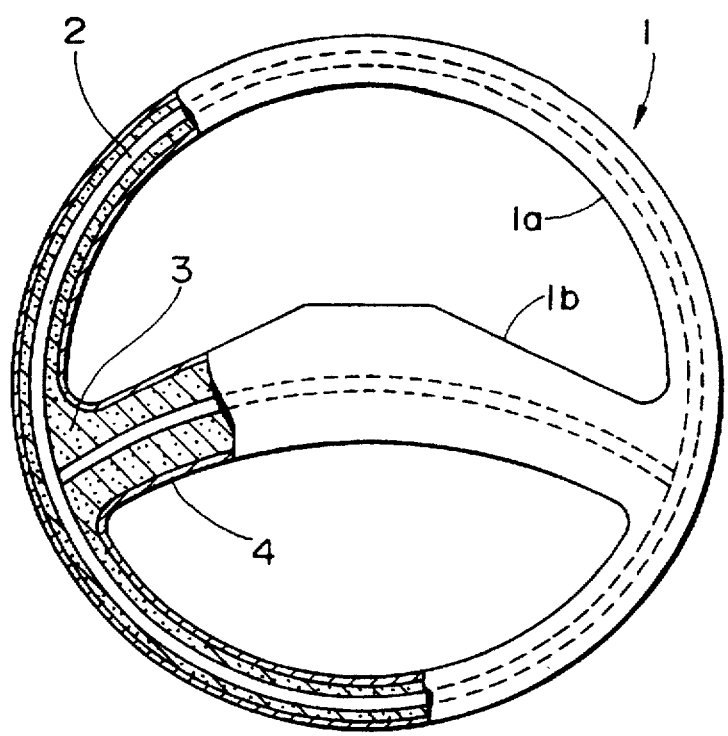
FIG. 1 is a partially cut away plane view showing a first example of a steering wheel manufactured by means of the manufacturing method of the present invention.

FIG. 1 is a partially cut away plane view showing a first example of a steering wheel manufactured according to the manufacturing method of the present invention. The steering wheel 1 comprises a rim section 1a and a spoke section 1b. This steering wheel 1 is generally constructed from a core wire 2 comprising a metal rod or pipe; a resin core 3; and a wooden surface 1a yer 4. In addition, the steering wheel 1 is divided into the front and back by the plane through which the core wire 2 passes. It is preferable that roughness (not shown in the figure) for grip be formed on the back of the rim 1a.

Figure 2A:
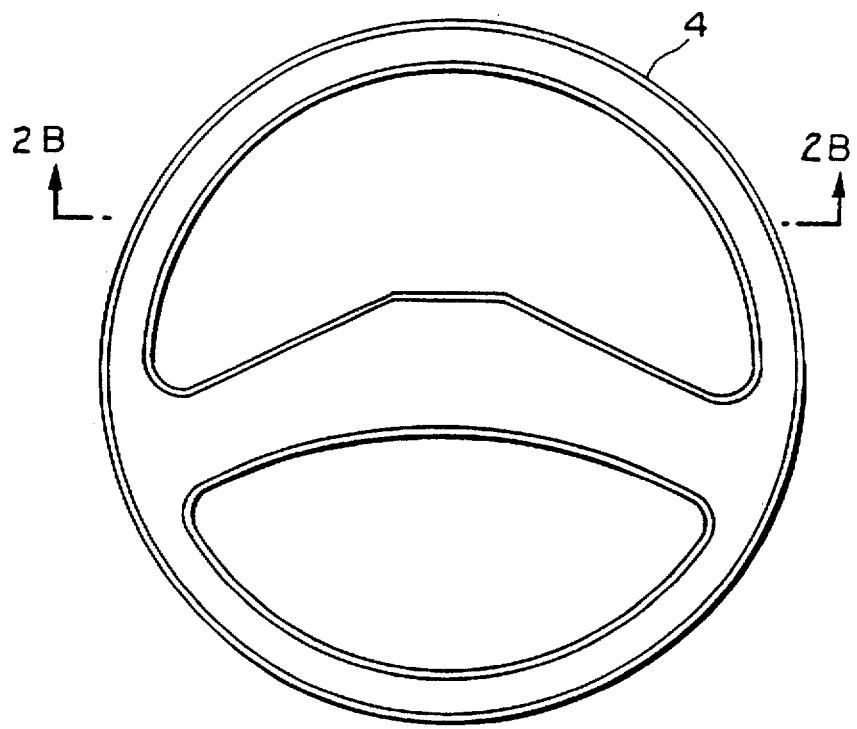
FIG. 2A and FIG. 2B show an example of a wooden surface layer used in the present invention.
Figure 2B:
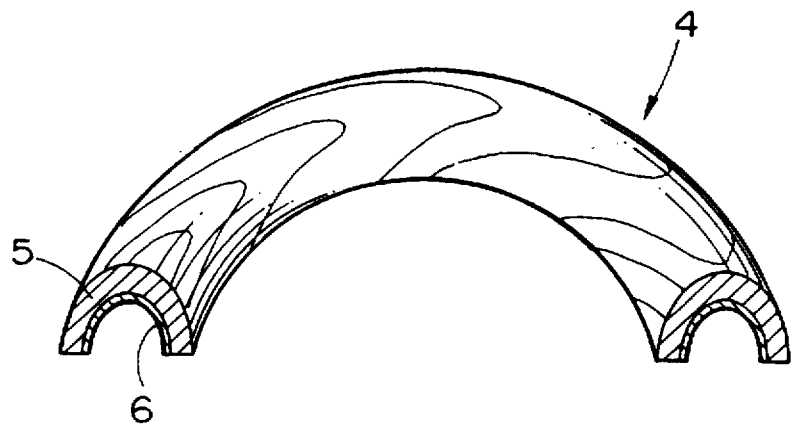

Furthermore, in the present application, the front of the steering wheel refers to the side which faces the driver of the vehicle, while the opposite side is referred to as the back. This kind of steering wheel 1 is manufactured in the following way. In the following, a first embodiment of the manufacturing method of the steering wheel of the present invention is explained. FIG. 2A and FIG. 2B show an example of a wooden surface layer 4; FIG. 2A is a plane view, and FIG. 2B is a cross-section along the line B—B of FIG. 2A.

First, as shown in FIG. 2A and FIG. 2B, a wooden surface layer 4 is premolded by curve-surface processing. At this time, the wooden surface layer (first wooden surface layer) 4 which makes up the front of the steering wheel 1, and the wooden surface layer (second wooden surface layer) 4 which makes up the back of the steering wheel 1 are respectively molded.

As these wooden surface layers 4, a decorative veneer 5 with a thickness of 0.2~1.0 mm, and preferably 0.5~0.7 mm can be used. This decorative veneer 5 can also be lined with a lining material (not shown in the figures) such as nonwoven fabric of artificial fiber, Japanese paper, and the like.

In addition, this type of decorative veneer 5 can be used singly, however, it is also possible to use a plywood which is laminated with a single sheet or a plurality of sheets of wooden veneer 6 on the back surface of the decorative veneer 5. In this case, it is preferable to use a wooden veneer 6 with a thickness of about 0.2~1.0 mm, and the thickness of the plywood after laminating is preferably about 0.2~3.0 mm. When the thickness of the plywood is less than 0.2 mm, its ability to maintain shape after premolding is poor, therefore, it is difficult in later processing to stably arrange the wooden surface layer 4 in the mold 7, and there is also a concern that rumples will form. In addition, when the thickness of the plywood is greater than 3.0 mm, moldability is poor.

The premolding of the wooden surface layer 4 is preferably performed by means of a hot press or a vacuum press. The hot press conditions are preferably 80°~140° C. for approximately 1~5 minutes, and the vacuum press conditions are preferably 80°~140° C. for approximately 1~10 minutes.

In the present embodiment, the wooden surface layer 4 which forms the front of the steering wheel and the wooden surface layer which forms the back of the steering wheel are respectively premolded using different molds, and in the wooden surface layer 4 which forms the back of the steering wheel, roughness for grip is formed.

In addition, before the premolding of the wooden surface layer 4, it is possible to perform publicly known methods such as humidifying treatments, alkali treatments using ammonia for example, and the like. When treatments such as these are performed, it is possible to soften the wooden surface layer 4, and, as a result, these treatments are effective in preventing cracks while curve-surface processing, and in making processing easier.

Figure 3:
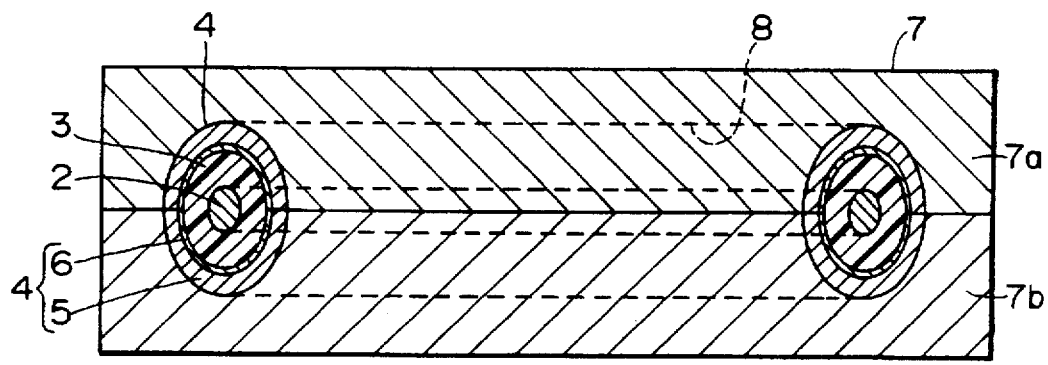
FIG. 3 is a cross-section showing an example of a molding step according to a first embodiment of the present invention.

Next, a mold 7, like that shown in FIG. 3, is prepared. The mold 7 is formed so that the inner surface shape of cavity 8 is equivalent to the desired outer surface shape of the steering wheel 1, and is divided, in a freely openable and closeable manner, into an upper mold 7a for the front of the steering wheel 1 and a lower mold 7b for the back of the steering wheel 1.

In addition a core wire 2 is prepared. The core wire 2 can be formed using a metal rod, a metal pipe, or a combination of a metal pipe and die-cast, and it is preferable that the rim section 1a and the spoke section 1b are unitarily formed.

Then, as shown in FIG. 3, premolded wooden surface layer 4 for the front and premolded wooden surface layer 4 for the back are arranged within the cavity 8 of the mold 7, and the core wire 2 is arranged in the middle of the space between these wooden surface layers 4 and 4. At this time, in order that the core wire 2 is positioned in the middle between these layers, for example, an aperture for fixing the core wire 2 within the mold 7 is provided in one part of the core wire 2. Alternatively, a thin plate having an aperture for determining the position of the core wire 2 can be set up within the mold 7.

Then, after filling the space between the wooden surface layers 4 and 4, and core wire 2 with foam resin 3, the resin foams, and also hardens forming a resin core 3. As the foam resin 3, foaming urethane resin, foam epoxy resin, and the like are preferably used. The formation of such a resin core 3 can be carried out using techniques such as injection molding, and RIM (reaction injection molding).

The RIM molding method is a method for forming elastic or rigid polymer resin by introducing two or more types of liquid material of low molecular weight and low viscosity, which are the main materials, into a mixing head while under pressure to be collision mixed, so that the mixed materials are injected into a sealed mold for a short time, in order to be reacted and hardened within the mold. This molding method is suitable for obtaining high molecular weight resin molded articles which are high in elasticity or hardness.

When a resin core 3 is molded using the above-mentioned foam resin, the molding conditions of the foam resin are preferably 100°~150° C. for 5~40 minutes.

In this molding process, as the wooden surface layer 4 is pressed against the inner surface of the cavity 8 by the pressure of the foam resin 3 when it is foaming, the wooden surface layer 4 is molded in the shape of the inner surface of the cavity 8. In addition, by means of the hardening of the foam resin 3, the core wire 2, the wooden surface layers 4 and 4, and the resin core 3 are uniformly integrated and the shape of the steering wheel 1 is formed.

In this way, the wooden surface layer 4 having a shape which divides the surface shape into two is used, and as the wooden surface layer 4 is formed using the internal pressure of the foam resin, the thickness of the decorative veneer 5 used in the wooden surface layer 4 can be as large as 0.2~1.0 mm, and preferably 0.5~0.7 mm.

The molded article obtained in this way is taken out of the mold 7, the seams of the two wooden surface layers 4 and 4 are finished with sand paper or the like, and then coloring, painting, polishing, or the like can be carried out according to need, and thereby, steering wheel 1 is obtained as a finished product.

Moreover, in the present embodiment, as resin 3, it is possible to use a resin which does not foam, for example, urethane resin, vinyl chloride resin, ABS resin, polypropylene resin, and the like can be preferably used. In this situation, the method for the formation of the resin core 3 can use techniques such as injection molding, and RIM (reaction injection molding).

At this time, the molding conditions are preferably a cylinder temperature of approximately 180°~300° C., a mold temperature of approximately 20°~100° C., and an injection pressure of approximately 300~1000 kg/cm$^2$.

In addition, when using these resins, as shown in FIG. 3, the premolded wooden surface layers 4 and 4, and the core wire 2 are arranged in the cavity 8 of the mold 7, and the resin 3 is injected into the space between the wooden surface layers 4 and 4, and the core wire 2. Then, the wooden surface layers 4 are pressed against the inner surface of the cavity 8 by pressure when the resin is injected, and, as a result, the wooden surface layers 4 and 4 are molded.

Figures 4A, 4B, 4C, 4D:
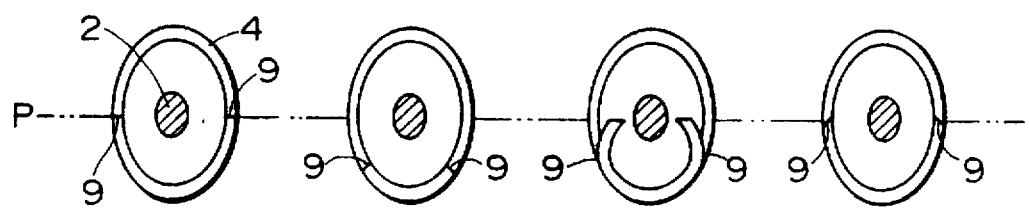
FIG. 4A–4D is a diagrammatic explanation showing an example of a cross-section of a steering wheel manufactured by means of a manufacturing method of the present invention.

In addition, in this embodiment, the shape of the wooden surface layer 4, at the time of premolding, is formed in such a way that the steering wheel 1 is divided into two by the plane through which the core wire 2 passes, and, as shown in FIG. 4A, is constructed in such a way that the seams of the wooden surface layers 4 and 4 are positioned above the plane P through which the core wire 2 passes; however, the position of the seams is not limited to this position. For example, it can also be structured in the ways shown in FIG. 4B–4D.

The example in FIG. 4B is structured in such a way that the shape of the wooden surface layer 4, at the time of premolding, is formed so that the front of the wooden surface layer 4 is larger than the back of the wooden surface layer 4, and the seams 9 and 9 are positioned further back than the above-mentioned plane P. In this way, the seams are positioned on the back and this is preferable from the point of view of appearance.

The example in FIG. 4C, when the wooden surface layers 4 and 4 are unitarily integrated, is structured so that the edges overlap one and other. When this is done, the strength of the joints between the front of the wooden surface layer 4 and the back of the wooden surface layer 4 are increased.

In the example in FIG. 4D, the end surfaces of the two wooden surface layers 4 and 4 are tapered, and those edges mutually face forming the seams 9 and 9. In this case, the strength of the joints between the front side and the back side of wooden surface layers 4 and 4 are increased.

Moreover, in this embodiment, when premolding, roughness for grip is formed in the wooden surface layer 4 which becomes the back; however, this roughness can be formed during the injection of the resin 3 in the molding process alone, without forming it during premolding. In this case, as the shape of the front and the back of wooden surface layer 4 is the same when premolding, premolding of both the front and the back of the wooden surface layer 4 can be done in one type of mold, thereby improving manufacturing efficiency.

In this way, in the manufacturing method for a steering wheel according to the present embodiment, wooden surface layers, and a core wire are arranged in a mold, and resin is injected into the space to the inside of the wooden surface layers; then the resin core formed by this resin, the wooden surface layer, and the core wire are unitarily molded.

Consequently, at the same time as the formation of the resin core, the wooden surface layer, the resin core, and the core wire can be unitarily integrated; therefore, the number of steps is reduced and manufacturing efficiency is increased. In addition, manufacturing is simple, and suitability for mass production is excellent.

In addition, as the wooden surface layer is molded by both premolding and unitary molding with the resin core, there is no step in which the wooden surface layer is cut, and the yield of materials is also good. Consequently, material costs can be reduced, and it is possible to provide low priced goods.

Furthermore, it is not necessary to cut a groove for arranging the core wire, and because there are no troublesome processes like this, manufacturing efficiency is high, and the manufacturing method is simple, and suitable for mass production.

In addition, the roughness for the grip in the back of the steering wheel can be formed when molding takes place in the mold, and no other processes, such as cutting, are necessary.

Consequently, there is no reduction in manufacturing efficiency, and it is possible to form the roughness for the grip easily.

In addition, as the obtained steering wheel has a wooden surface, it has a high quality appearance and looks as if it had been carved from original wood, for example, from Aphananthe aspera, giving a sense of luxuriousness.

In the following, a second embodiment of the manufacturing method for a steering wheel according to the present invention is explained.

First, in the same way as in the above-mentioned first embodiment, and as shown in FIGS. 2A and 2B, a wooden surface layer 4 is premolded by curve-surface processing. At this time, a wooden surface layer 4 which forms the front of a steering wheel 1, and a wooden surface layer 4 which forms the back of the steering wheel 1 are respectively molded. In addition, it is preferable that roughness for grip be formed in the wooden surface layer which will become the back.

Figure 5:
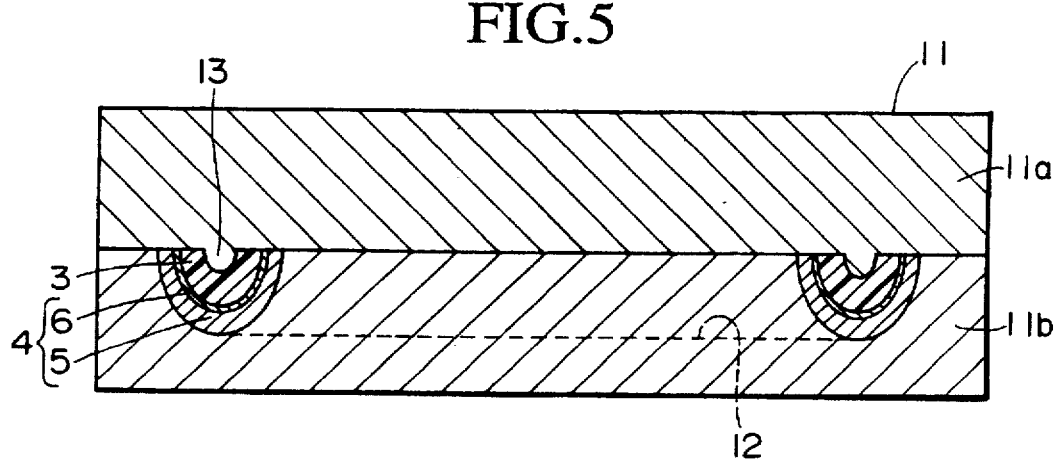
FIG. 5 is a cross-section showing an example of a molding step according to a second embodiment of the present invention.

Next, a mold 11, like that shown in FIG. 5, is prepared. The mold 11 comprises a freely openable and closeable top mold 11a and bottom mold 11b.

A cavity 12 is formed in the bottom mold 11b, and the shape of the inner surface of the cavity 12 is formed so that it is equivalent to the desired outer surface shape of whichever of the front or back parts of the steering wheel 1 is being molded. In this embodiment, the front part is a part which faces a car driver upon assembly, while the back part is a part which is placed to a side opposite to the front part upon assembly. According to this embodiment, the mold (first mold) 11 used for the front and the mold (second mold) 11 used for the back are prepared separately. Roughness for grip is formed in the cavity 12 of the mold 11 used for molding the back.

In the upper mold 11a, a projection 13, which has a semicircular cross-section obtained by dividing a core wire 2 into two, is formed on the joining surface with the lower mold 11b. This projection 13 is shaped in such a way that, when the upper mold 11a and the lower mold 11b are closed, it is positioned in the center of the opening of the cavity 12.

First, molding is conducted using the mold (first mold) 11 for the front part. That is to say, as shown in FIG. 5, the premolded wooden surface layer (front side) 4 is arranged in the cavity 12 of the mold 11.

After the space to the inside of the wooden surface layer 4 is filled with a foam resin 3, the resin foams, and also hardens forming a resin core 3. As the foam resin 3, foaming urethane resin, foam epoxy resin, and the like are preferably used. The formation of such a resin core 3 can be carried out using techniques such as injection molding, and RIM (reaction injection molding).

At this time, the molding conditions of the foam resin are preferably 100°~150°0 C. for approximately 5~40 minutes.

In this molding process, as the wooden surface layer 4 is pressed against the inner surface of the cavity 12 by the pressure of the foam resin 3 when it is foaming, the wooden surface layer 4 is molded in the shape of the inner surface of the cavity 12. In addition, by means of the hardening of the foam resin 3, the wooden surface layer 4, and the resin core 3 are uniformly integrated.

In this way, a molded component (front side) of approximately U shaped cross-section having a groove of concave shape corresponding to the projection 13 formed in its upper surface by means of the projection 13 is obtained without a cutting process.

Separately, molding is conducted using the mold (second mold) 11 for the back part. That is to say, as shown in FIG. 5, the premolded wooden surface layer (back side) is arranged in the cavity 12 of the mold 11. In the same way as molding the front, the space to the inside of the wooden surface layer 4 is filled with the foam resin 3, the resin foams and hardens, and, by means of the projection 13, a molded component (back side) of approximately U shaped cross-section having a groove in its surface is obtained.

The molded component of the front and the molded component of the back obtained by this method are taken out of their respective molds 11 and 11, the core wire 2 is arranged in the groove formed by means of the projection 13, and these two molded components and the core wire 2 are joined and unitarily integrated into the shape of the steering wheel 1.

At this time, the core wire 2 can be used with the core wire 2 for the rim section 1a and the core wire 2 for the spoke section 1b unitarily integrated in advance, or the rim section 1a and the spoke section 1b can be joined when joining the above-mentioned molded components.

Next, after finishing the seam of the two molded components with sand paper or the like, coloring, painting, polishing, or the like can be carried out according to need, and thereby, the steering wheel 1 is obtained as a finished product.

Moreover, in the present embodiment, as resin 3, it is possible to use a resin which does not foam, for example, urethane resin, vinyl chloride resin, ABS resin, polypropylene resin, and the like can be used. In this situation, the method for the formation of the resin core 3 can use techniques such as injection molding, and RIM (reaction injection molding).

At this time, the molding conditions are preferably a cylinder temperature of approximately 180°~300° C., a mold temperature of approximately 20°~100° C., and an injection pressure of approximately 300~1000 kg/cm².

In addition, when using these resins, as shown in FIG. 5, the premolded wooden surface layer 4 is arranged in the cavity 12 of the mold 11, and the resin 3 is injected into the space to the inside of the wooden surface layer 4. Then, the wooden surface layer 4 is pressed against the inner surface of the cavity 12 by means of pressure when the resin is injected, and, as a result, the wooden surface layer 4 is molded.

Moreover, in this embodiment, when premolding, roughness for grip is formed in the wooden surface layer 4 which becomes the back; however, this roughness can be formed during the injection of the resin 3 in the molding process alone, without forming it during premolding. In this case, as the shape of the front and the back of wooden surface layer 4 is the same when premolding, premolding of both the front and back of the wooden surface layer 4 can be done in one type of mold, thereby improving manufacturing efficiency.

In this way, in the manufacturing method for a steering wheel according to the present embodiment, a resin core and a wooden surface layer are unitarily molded forming a molded components, and then these molded components and a core wire are joined. In this method, as a groove for arranging the core wire can be formed at the same time as molding the resin core, there is no need to cut this groove by a separate process. As there are no troublesome processes like this, the manufacturing method is simple, and suitable for mass production.

The shape of the steering wheel 1 is not limited to the form shown in FIG. 1, it can also have a form that does not have a spoke 1b. In addition, the wooden surface layers 4 for use on the front or for use on the back of steering wheel are not limited to shapes which correspond to the full circle of the rim 1a, they can also be formed into an arch which is a division of the rim 1a.

Figure 6:
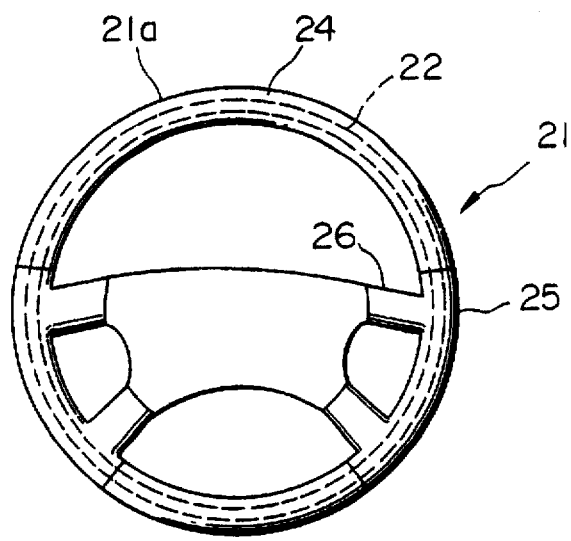
FIG. 6 is a plane view showing a second example of a steering wheel manufactured according to the manufacturing method of the present invention.

FIG. 6 is a plane view showing a second example of a steering wheel manufactured according to the manufacturing method of the present invention. In FIG. 6, a steering wheel 21, a rim section 21a, a core wire 22, a wooden surface layer 24, and a grip 25 are respectively shown. The major differences between this steering wheel example and the example shown in FIG. 1 are that a spoke is not provided, that resin grips 25 are formed in two places on rim 21a, and that, with the exception of these grips 25, arch shaped wooden surface layers 24 are used (in two places) on rim 21a. In addition, on grip 25, an air bag installation section 26 is formed which protrudes inward from steering wheel 21.

This type of steering wheel is manufactured, for example, in the following way. In the following, a third embodiment of the manufacturing method for a steering wheel of the present invention is explained.

First, the core wire 22 is prepared. The wire core 22 used in the present embodiment is ring shaped, and the materials are the same as those used in the above-mentioned first embodiment of the manufacturing method of the present invention.

Figure 7:
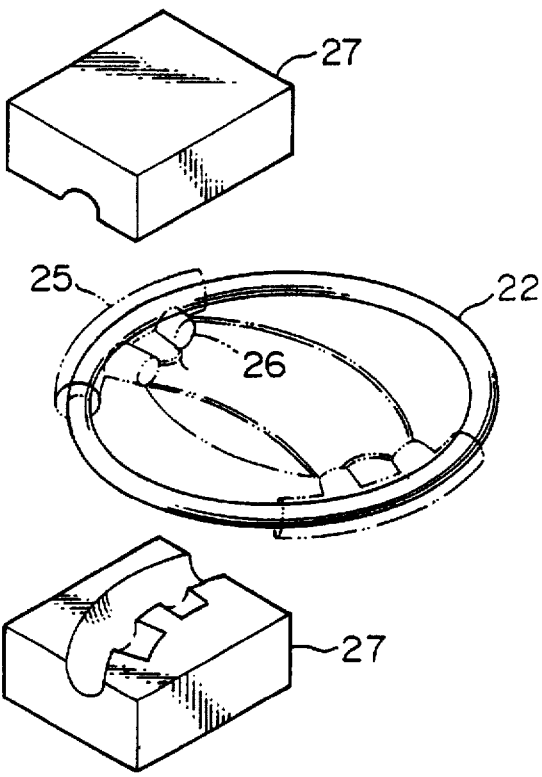
FIG. 7 is a perspective view showing an example of the molding process in a third embodiment of the present invention.

Next, as shown in FIG. 7, a section of ring shaped wire core 22 is arranged in a mold 27, and grip 25 is molded by means of an RIM molding method. Resins which are suitable for use in forming the grip 25 are the same as those used in the above-mentioned first embodiment of the manufacturing method of the present invention.

Next, the wooden surface layer 24, which is used on those parts of rim 21a other than grip 25, is premolded. At this time, the wooden surface layer 24 which makes up the front of steering wheel 21 (first wooden surface layer) and the wooden surface layer 24 which makes up the back of the steering wheel 21 (second wooden surface layer) are respectively premolded. The plane shape of the wooden surface layer 24 used in the present embodiment is an arch shape which corresponds to the rim 21a excluding the grip 25. This wooden surface layer 24 is only different to the wooden surface layer 4 in the above-mentioned first embodiment of the manufacturing method of the present invention in its plane shape, the materials and the method of premolding are the same.

Figure 8:
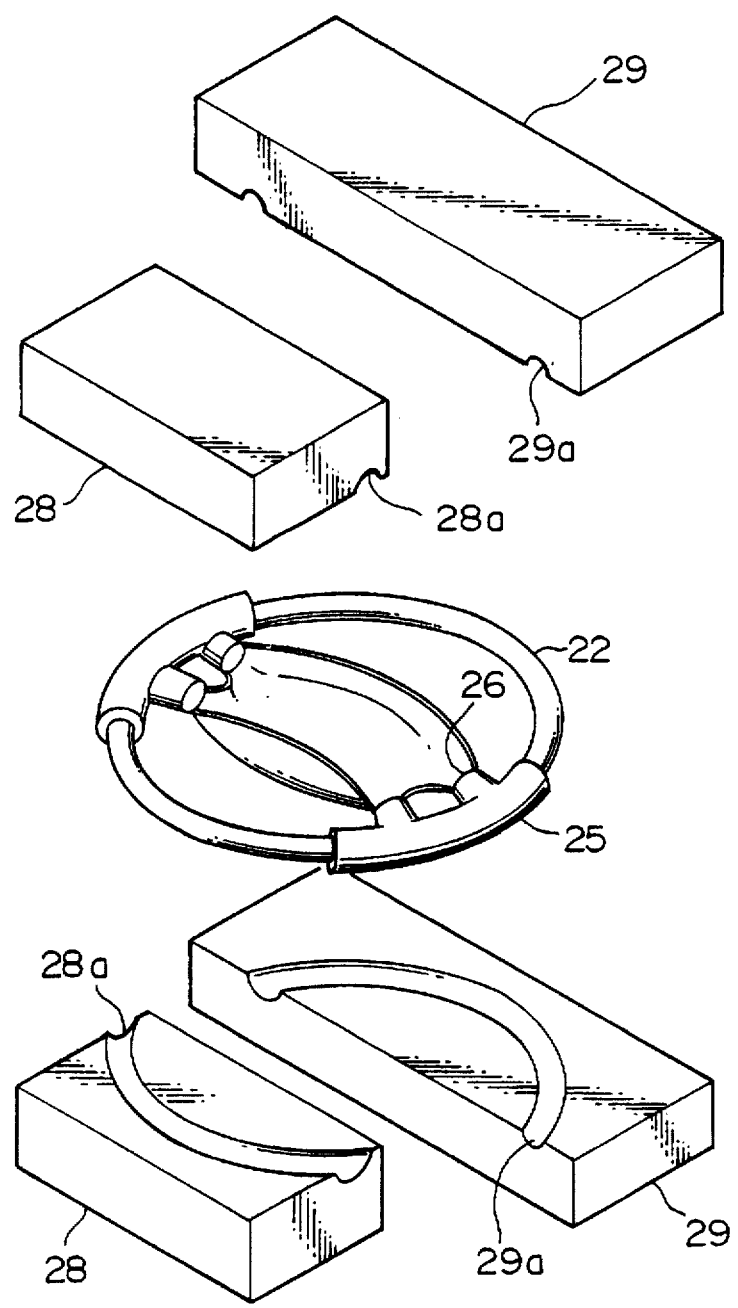
FIG. 8 is a perspective view showing an example of the molding process in a third embodiment of the present invention.

Next, molds 28 and 29 like those shown in FIG. 8 are prepared. The molds 28 and 29 are formed so that the inner surface shape of cavities 28a and 29a are equivalent to the desired outer surface shape of the two arch shaped sections of the rim 21a excluding the grip 25 respectively. In addition, the molds 28 and 29 are divided respectively, in a freely openable and closeable manner, into an upper mold for the front of the steering wheel 21 and a lower mold for the back of the steering wheel 21.

Then, the premolded wooden surface layer 24 for the front and the premolded wooden surface layer 24 for the back are arranged within the cavities 28a and 29a of the molds 28 and 29, and the core wire 22 is arranged in the middle of the space between these wooden surface layers 24.

Then, after filling the space between the wooden surface layers 24 and 24, and wire core 22 with foam resin, the resin foams, and also hardens forming a resin core (not shown in the Figure). The resins which can be used are the same as the resins which can be used in the above-mentioned first embodiment of the manufacturing method of the present invention, and the molding conditions are also the same.

The molded articles obtained in this way are taken out of the molds 28 and 29, the seams of the two wooden surface layers 24 and 24 are finished with sand paper or the like, then coloring, painting, polishing, or the like can be carried out according to need, and, thereby, steering wheel 1 is obtained. The grip 25 of the obtained steering wheel 21 can be finished by putting leather around it, and an airbag can be installed inside the airbag installation section 26.

By means of the manufacturing method of the present embodiment, a steering wheel is obtained which has a grip 25 wrapped in leather, a rim 21a, excluding grip 25, which has a surface comprising timber, and in which an airbag is installed in the center.

In this embodiment, when forming rim 21a, excluding grip 25, it is also possible to join the core wire 22 and the molded components obtained by unitarily molding a resin core and wooden surface layer 24 in the same way as in the above-mentioned second embodiment of the manufacturing method of the present invention.

Although the invention has been described in detail herein with reference to its preferred embodiments and certain described alternatives, it is to be understood that this description is by way of example only, and it is not to be construed in a limiting sense. It is further understood that numerous changes in the details of the embodiments of the invention, and additional embodiments of the invention, will be apparent to, and may be made by persons of ordinary skill in the art having reference to this description. It is contemplated that all such changes and additional embodiments are within the spirit and true scope of the invention as claimed below.

What is claimed is:

1. A method of manufacturing a molded article, comprising the steps of:

provided a first wooden surface layer in a first mold;

introducing resin material into a cavity in said first mold to press said first wooden surface layer against said first mold to form a first molded component;

providing a second wooden surface layer in a second mold, introducing resin material into a cavity in said second mold to press said second wooden surface layer against said second mold to form a second molded component;

providing a core wire in grooves in said first and second molded components; and laminating together said first and second molded components.

2. A method according to claim 1, wherein said first and second mold have projections therein to form said grooves in said first and second molded components.

3. A method according to claim 1, wherein said first wooden surface layer and said second wooden surface layer are equal in cross section.

4. A method according to claim 1, wherein said molded article is a steering wheel.

5. A method according to claim 4, wherein said first wooden surface layer is disposed at a first side, and said second wooden surface layer is disposed at a second side opposite to said first side.

6. A method according to claim 1, wherein said resin material comprises a material selected from a group consisting of foaming urethane resin, foam epoxy resin, urethane resin, vinyl chloride resin, acrylonitrile-butadiene-styrene (ABS) resin, and polypropylene (PP) resin.

7. A method according to claim 1, wherein the thickness of said first wooden surface layer and said second wooden surface layer is 0.2–1.0 mm.

8. A method according to claim 1, wherein said first wooden surface layer and said second wooden surface layer are premolded.

* * * * *